United States Patent [19]
Alford et al.

[11] 4,313,835
[45] Feb. 2, 1982

[54] EMULSIFIER SYSTEM FOR TERTIARY OIL RECOVERY

[75] Inventors: Harvey E. Alford, Amherst; David Frazier, Lakewood, both of Ohio

[73] Assignee: The Standard Oil Company, Cleveland, Ohio

[21] Appl. No.: 97,029

[22] Filed: Nov. 21, 1979

[51] Int. Cl.³ .............................................. E21B 43/22
[52] U.S. Cl. .................................. 252/8.55 D; 166/274
[58] Field of Search ................... 252/855 D; 166/274, 166/275

[56] References Cited

U.S. PATENT DOCUMENTS

| | | | |
|---|---|---|---|
| 2,653,909 | 9/1953 | Frazier | 252/34.7 |
| 3,036,631 | 5/1962 | Holbrook | 166/273 X |
| 3,195,629 | 7/1965 | Leach | 166/273 X |
| 3,366,174 | 1/1968 | Ferrell et al. | 252/8.55 D X |
| 3,477,511 | 11/1969 | Jones et al. | 166/274 |
| 3,493,048 | 2/1970 | Jones | 166/252 |
| 3,506,071 | 4/1970 | Jones | 166/274 X |
| 3,926,255 | 12/1975 | Williams | 166/270 |
| 3,929,190 | 12/1975 | Chang et al. | 166/274 |
| 4,008,769 | 2/1977 | Chang | 166/274 |
| 4,037,656 | 7/1977 | Cooper | 166/270 |

Primary Examiner—Herbert B. Guynn
Attorney, Agent, or Firm—William A. Heidrich; Herbert D. Knudsen; Larry W. Evans

[57] ABSTRACT

A new emulsifier system for use in the tertiary recovery of oil comprises a mixture of an alcohol having no more than 12 carbon atoms and a surfactant comprising a neutralized, oxidized solvent extracted oil.

6 Claims, No Drawings

EMULSIFIER SYSTEM FOR TERTIARY OIL RECOVERY

BACKGROUND OF THE INVENTION

The present invention relates to a new emulsifier system for use in enhanced (tertiary) oil recovery.

All surfactants currently under development for use in enhanced oil recovery are sodium petroleum sulfonates. While sodium petroleum sulfonates appear to hold the most promise for use as surfactants in enhanced oil recovery, they are disadvantageous for a number of reasons. For example, sodium petroleum sulfonates are produced using large quantities of sulfuric acid or sulfur trioxide, and hence specialized equipment and handling procedures are required. In addition, waste materials, i.e. acid sludges, are produced and these represent a significant waste disposal problem. Furthermore, sodium petroleum sulfonates have not shown good stability over a wide range of brine concentrations. Finally, sodium petroleum sulfonates are relatively expensive.

In view of these deficiencies, it is desirable to provide a surfactant for use in enhanced oil recovery which avoids these disadvantages.

Accordingly, it is an object of the present invention to provide a new surfactant for use in enhanced oil recovery which can be made without using sulfuric acid or sulfur trioxide, which is stable over a wide range of brine concentrations and which is inexpensive and simple to make.

SUMMARY OF THE INVENTION

These and other objects are accomplished by the present invention which is based on the discovery that a surfactant ideally suited for use in enhanced oil recovery can be made by air oxidizing solvent extracted oils, neutralizing the air oxidized solvent extracted oil with an alkali metal hydroxide to produce a grease-like soap and then combining the grease-like soap with an alcohol, such as t-butanol. The emulsifier so obtained is stable over a wide range of brine concentrations, uses inexpensive starting materials, is simple and inexpensive to make, does not require specialized equipment or produce significant waste. In addition, the emulsifier system has been found to exhibit an extremely low interfacial tension with both brine and hydrocarbon and in addition exhibit high oil recovery in sand pack core tests, thereby making it ideally suited for use an an emulsifier system in enhanced oil recovery.

Thus, the present invention provides a novel emulsifier system for use in enhanced oil recovery comprising an emulsifier system comprising a mixture of a surfactant and an alcohol having no more than 12 carbon atoms, the surfactant comprising a neutralized oxidized solvent extracted oil.

In addition, the present invention also provides an improvement in the known process for the tertiary recovery of oil wherein brine or water, an emulsifier system and a polymer are injected into an injection well and oil recovered from a producing well, the improvement in accordance with the invention comprising using as said emulsifier system a mixture of an alcohol having no more than 12 carbon atoms and a surfactant comprising a neutralized, oxidized solvent extracted oil.

DETAILED DESCRIPTION

As indicated above, the inventive emulsifier system comprises a mixture of an alcohol and a surfactant composed of a neutralized air oxidized solvent extracted oil.

Surfactant

The surfactant of the emulsifier system of the present invention is produced by the neutralization of an air oxidized solvent extracted oil. Solvent extracted oils are conventional petroleum refinery streams produced by extracting aromatics from various streams taken off the vacuum distillation tower of a refinery with solvents such as furfural and phenol. They are commonly referred to as either solvent extracted neutral oils or bright stocks, and normally contain no more than about 12, preferably 5% aromatics. In accordance with the present invention, any solvent extracted oil having a viscosity ranging from 50 SUS (Saybolt Universal Seconds) at 100° F. to 250 SUS at 210° F. can be used. Preferred solvent extracted oils are those having a viscosity between 100 SUS at 100° F. and 120 SUS at 210° F. The most preferred solvent extracted oil is SEN-300. It is also desirable that the solvent extracted oils be subjected to dewaxing and clay contacting before use in the present invention, although this is not essential.

In making the surfactant of the inventive emulsifier system, the solvent extracted oil is subjected to air oxidation. Air oxidation of hydrocarbons is well known, and a description of many air oxidation techniques can be found in the literature. In the present invention, air oxidation is conveniently accomplished by heating the solvent extracted oil to elevated temperature while contacting the oil with a suitable amount of air. Normally a catalyst is included in the solvent extracted oil to enhance the reaction rate.

In accordance with the present invention, the catalyst used in air oxidation is normally a mixture of an oil soluble metal compound and a salt of a strong base and a weak acid. Oil soluble metal compounds are well known catalysts for the oxidation of hydrocarbons. Examples of such compounds are manganese stearate, iron naphthenate, iron stearate, copper naphthenate, copper stearate and the like. Mixtures of such compounds can be used. Compounds containing manganese and/or iron are especially preferred.

As the second component of the catalyst, any salt of a strong base and a weak acid can be used. For example, alkali metal carbonates and acetates are useful. Alkali metal carbonates are preferred and sodium carbonate is most preferred.

The catalyst system can be added to the oil incrementally, although it is preferred to add the entire catalyst charge to the oil before oxidation begins. Moreover, it is convenient to add the oil soluble metal compound in the form of a solution in a light hydrocarbon such as a light distillate or diesel oil.

The amount of catalyst system added to the oil can vary widely. When the oil soluble metal compound is used in the form of a solution in a light hydrocarbon, the amount added to the oil should be between about 0.05 to 5 cc. of the oil soluble metal compound solution containing 6% metal per 100 grams of oil. The preferred amount of oil soluble metal compound is 0.1 to 2.0 cc. per 100 grams of oil and most preferred is 1 cc. per 100 grams oil. The amount of the second component of the catalyst system, i.e. the salt of a strong base and weak acid, is normally about 0.05 to 2 grams per 100 grams of oil. The preferred amount is 0.1 to 1.0 grams per 100 grams of oil and the most preferred amount is about 0.2 grams per 100 grams of oil.

Oxidation is accomplished by contacting air with the oil/catalyst mixture while heating the mixture to elevated temperature. Normally, air is introduced at a rate of about 1 to 4 SCF per 100 grams of oil per hour, although any amount is operable. About 2.8 SCF per 100 grams of oil per hour is preferred. The reaction temperature is normally about 250° F. to 350° F. with 285° F. being preferred. As the oil/catalyst mixture is heated from ambient, an exothermic reaction occurs beginning at a temperature of about 250° F. to 275° F. The reaction temperature is increased by about 20° F. to 50° F. when the exothermic reaction occurs. After this initial exothermic reaction, heat must be supplied to keep the oxidation going. It has been observed that in some instances the reaction is killed at the higher end of the above temperature range and in any event higher temperatures do not make the reaction go faster. Therefore it is prefable to operate at the lower end of the above temperature range.

The oxidation reaction is continued until the oil exhibits an acid number of about 10 to 40, preferably about 15 to 35, most preferably about 30 to 35 mg. KOH/gram sample. As a practical matter, acid numbers higher than about 40 should be avoided since this means that too much of the oil is forming dibasic acids which are ineffective as surfactants. On the other hand, acid numbers of at least about 10 and preferably 15 are necessary to give significant surfactant effect.

Usually, the air oxidation will take from about 1 to 12 hours or more, depending upon the reaction conditions, the oil being used and the acidity desired in the final product. It has been found, for example, that using SEN-300 as the oil and operating at the most preferred conditions specified above, an oxidation time of about 5 to 8 hours, most preferably about 8 hours, gives a suitable oxidation product. Under these conditions, the acid number of the resulting product as determined by ASTM D-974, is about 35 mg. KOH/g sample. This is equal to 0.624 meq KOH/g sample. Under the same conditions, lower viscosity oils will have a higher acid number and higher viscosity oils will have a lower acid number.

To produce the surfactant of the inventive emulsifier system, the oxidized oil described above is reacted with an aqueous solution of an inorganic base, preferably an alkali metal hydroxide. Sodium hydroxide is preferred although the other alkali metal hydroxides can be employed. The amount of aqueous hydroxide solution reacted with the oxidized oil can vary widely. Normally the amount of base used is about 1 to 4.5 or more times the millequivalents indicated by the acid number. A range of 2 to 2.75 times the millequivalents indicated by the acid number is preferred.

The reaction can be carried out at any temperature, although temperatures between about room temperature and 250° F. are most practical. The reaction system, of course, should be stirred from time to time to ensure complete reaction.

The time for the reaction to be completed varies primarily upon reaction temperature with higher temperatures causing faster reaction times. In any event, the product produced by this procedure, i.e. the surfactant of the invention, is in the form of a semi-solid grease-like material which may or may not contain water. Thus the reaction should be continued until oxidized solvent extracted oil described above, which is a viscous fluid somewhat more viscous than the solvent extracted oil starting material, changes into a semi-solid grease-like material. This material is preferably completely neutralized although it need not be, i.e. partially neutralized materials are also effective. When the reaction is carried out at room temperature, neutralization may take up to 2 days or even longer. When the reaction is carried out at higher temperature, e.g. 250° F., the reaction may proceed to conclusion in as little as a half an hour or even shorter times.

Production of neutralized, oxidized solvent extracted oils is shown in Frazier, U.S. Pat. No. 2,653,909, the disclosure of which is incorporated herein by reference.

To make the emulsifier system of the present invention, the surfactant described above is admixed with an alcohol. Any alcohol containing 12 carbon atoms or less can be employed although alcohols having from 3 to 6 carbon atoms are preferred. T-butanol is the most preferred alcohol. The surfactant/alcohol ratio can vary widely and is normally between about 0.5 to 12 parts surfactant per part alcohol on a weight basis. Preferably, 1 to 4 parts surfactant per part alcohol are used. Most preferably, 2 parts surfactant to 1 part alcohol are used.

EXAMPLES

Preparation of Emulsifier System 900 g. of 300 SEN using 9 cc (1 cc/100 g.) manganese naphthenate solution and 1.8 g. (0.2 g/100 g.) sodium carbonate catalyst, was air oxidized using an air rate of 25 ft$^3$/hr (2.8 ft$^3$/hr/100 g.) for 8 hours at 285° F. The acid number of the resulting product was 35. The yield of product was about 97 weight percent. 200 g. of this product was neutralized with 19.968 g. of 50 weight percent sodium hydroxide for 5 days at room temperature. The mixture was stirred with a spatula at least twice a day. The resulting surfactant product was grease-like and appeared to be homogeneous. The actual amount (9.984 g.) of sodium hydroxide used for neutralization was equal to 2 times the value indicated by acid number. 50 g of t-butanol was dissolved in 100 g. of the surfactant described above to produce an emulsifier system of the present invention.

Testing of Emulsifer System

To learn more about how the emulisifer system of the present invention behaves when in contact with both hydrocarbon and a brine solution, the following runs were done. In each run, 8 ml. of the emulsifier system was dissolved in 46 ml. of normal octane (hydrocarbon phase). This was then added to 46 ml. of a brine solution in 100 ml. graduated cylinder. The phases were mixed by inverting the cylinder several times. The cylinder was then allowed to stand for 2 weeks to allow the phases to separate and equilibriate. The volume of each phase was then determined. Fourteen runs were accomplished with the brine concentration ranging from 0.5 to 8.0% NaCl. The results are reported in the following Table I.

TABLE I

| | Example 1 Phase Behavior of Emulsifier System | | | |
|---|---|---|---|---|
| Run | Brine Wt. % NaCl | Ml Brine | Ml Middle Phase | Ml Oil |
| 1 | 0.50 | 54.0 | 0.0 | 46.0 |

TABLE I-continued

Example 1
Phase Behavior of Emulsifier System

| Run | Brine Wt. % NaCl | Ml Brine | Ml Middle Phase | Ml Oil |
|---|---|---|---|---|
| 2 | 0.75 | 54.2 | 0.0 | 45.8 |
| 3 | 1.00 | 54.9 | 0.0 | 45.1 |
| 4 | 1.50 | 56.9 | 0.0 | 43.1 |
| 5 | 1.75 | 37.0 | 20.1 | 42.9 |
| 6 | 2.00 | 41.0 | 15.8 | 43.2 |
| 7 | 2.50 | 43.2 | 15.0 | 41.8 |
| 8 | 3.00 | 43.8 | 13.3 | 42.9 |
| 9 | 3.50 | 44.8 | 13.4 | 41.8 |
| 10 | 4.00 | 46.3 | 11.4 | 42.3 |
| 11 | 5.00 | 45.7 | 12.8 | 41.5 |
| 12 | 6.00 | 46.0 | 7.0 | 47.0 |
| 13 | 7.00 | 46.5 | 3.5 | 50.0 |
| 14 | 8.00 | 47.0 | 0.0 | 53.0 |

As will be noted in Table I, from a brine concentration of 0.5 to 1.5 weight percent, all the emulsifier is in the brine phase. At 1.75% sodium chloride, a third middle phase is formed and the volume of this phase is much greater than the 8 ml. of emulsifier added to the system. Comparing the volumes of the hydrocarbon and brine phases, it is clear that some of the hydrocarbon (3.5 ml.) and more of the brine (9 ml.) has been incorporated in the middle phase. The middle phase is larger than the amount of emulsifier system added to a brine concentration of 5%. At this level, 0.3 ml. of brine and 4.5 ml. of hydrocarbon are in the middle phase. Even at a brine concentration of 7% the third phase is formed, although in less amounts than the amount of emulsifier system added since some of the emulsifier has transferred to the hydrocarbon phase. At 8% brine the system reverts back to two phases, the bulk of the emulsifier system being in the hydrocarbon phase.

These results indicate that the inventive emulsifier system is stable over a very wide range of brine concentration that might be encountered in an oil field. The effective range with this emulsifier system is much broader than for petroleum sulfonate which means that the inventive emulsifier system should operate in a superior manner in the field.

Interfacial Tension Measurements

To be of value in enhanced oil recovery, the emulsifier system of the present invention must exhibit an extremely low interfacial tension with both hydrocarbon and brine phases. To determine these interfacial tensions when using the emulsifier system of Example 1, 8 ml. of this emulsifier system was dissolved in 46 ml. of normal octane. The mixture obtained was then mixed with 46 ml. of a 2% NaCl aqueous solution and allowed to equilibriate. 15 volume percent of a middle phase was obtained. The interfacial tension was measured with a spinning drop tensiometer developed by the University of Texas and it was found that the interfacial tension between the middle phase and the hydrocarbon phase was $1.35 \times 10^{-4}$ dynes/cm. and the interfacial tension between the middle phase and the aqueous phase was $3.1 \times 10^{-3}$ dynes/cm.

EXAMPLE 2

Another emulsifier system of the present invention was prepared. In this preparation, Example 1 was repeated except that four parts surfactant were added to one part t-butanol.

6 ml. of the emulsifier system so obtained was dissolved in 47 ml. of dodecane. The mixture obtained was then mixed with 47 ml. of a 3% NaCl aqueous solution and allowed to equilibriate. 15 volume percent of a middle phase was obtained. The interfacial tensions were again measured and it was found that the interfacial tension between the middle phase and the hydrocarbon phase was $1.27 \times 10^{-4}$ dynes/cm. and the interfacial tension between the middle phase and the aqueous phase was $3.3 \times 10^{-3}$ dynes/cm.

From the interfacial tension measurements in both Examples 1 and 2, it can be seen that extremely low interfacial tensions are obtained. Thus, the inventive emulsifier systems should be ideally suited for use in enhanced oil recovery where low interfacial tensions are required.

Example 3

In order to test the inventive emulsifier systems in the tertiary recovery of oil, a tertiary oil recovery test was accomplished using the emulsifier system of Example 1. In this test, a glass cylinder 1 inch in diameter and 12 inches long was packed with sand to form a sand pack having a permeability of 4.4 Darcies. The sand pack was then flushed with carbon dioxide and then flushed with a 2% aqueous NaCl solution as brine. Next, the sand pack was flushed with 50 cc. of normal octane as the hydrocarbon and the sand pack was then again flushed with the brine solution. A solution of 8 ml. of the emulsifier system of Example 1 in 46 ml of n-octane was prepared. At the conclusion of the second brine flush, a 7% pore volume emulsifier system slug was injected into the sand pack at a rate of 6 ml. per hour. This was followed by a 1 pore volume slug of a polymer solution consisting of 1,000 parts per million Dow P-700 (a partially hydrolyzed polyacrylamide) dissolved in a 2% NaCl aqueous solution. The effluent from the sand pack was recovered and it was found that the amount of tertiary oil recovered was 75%.

EXAMPLE 4

Example 3 was repeated except that the emulsifier system of Example 2 was used, dodecane was used as the hydrocarbon, the brine solution was 3% NaCl, the polymer solution contained 2,000 ppm Dow P-700, the emulisifier solution contained 6 ml. emulsifier and 47 ml. of dodecane and a 5% pore volume slug of the emulsifier system was injected at a rate of 6 ml. per hour. The amount of tertiary oil recovered in this example was 84%.

From the foregoing examples, it can be seen that the emulsifier system of the present invention is very effective in recovering hydrocarbon otherwise unrecoverable. Thus, the emulsifier systems of the present invention are ideally suited for use in tertiary recovery of oil.

Although only a few embodiments of the present invention have been described above, many modifications can be made without departing from the spirit and scope of the invention. All such modifications are intended to be included within the scope of the present invention, which is to be limited only by the following claims.

We claim:

1. In a process for the tertiary recovery of oil wherein brine or water, an emulsifier system and a polymer are injected into an injection well and oil recovered from a producing well, the improvement comprising using as said emulsifier system a mixture of 0.5 to 12 parts by weight of a surfactant and 1 part by weight of an alcohol having no more than 12 carbon atoms, said surfactant comprising a neutralized air-oxidized solvent extracted oil wherein the solvent extracted oil has a viscosity between 50 SUS at 100° F. and 250 SUS at 210° F. before oxidation, wherein the oxidation reaction is conducted at a temperature from about 200° to about 250° F. and wherein the oxidized solvent extracted oil has an acid number of 10–40 before neutralization.

2. The process of claim 1 wherein said oxidized solvent extracted oil has an acid number of about 30 to 35 and further wherein said alcohol is t-butanol.

3. The process of claim 2 wherein the amount of base used to neutralize the oxidized solvent extracted oil is 1 to 4.5 times the milliequivalents indicated by the acid number.

4. The process of claim 1 wherein the amount of base used to neutralize the oxidized solvent extracted oil is 1 to 4.5 times the milliequivalents indicated by the acid number.

5. The process of claim 1 wherein the emulsifier system comprises 1 to 4 parts surfactant per part alcohol.

6. The process of claim 5 wherein the emulsifier system comprises 2 parts surfactant per part alcohol.

* * * * *